US012678733B2

(12) United States Patent     (10) Patent No.:   US 12,678,733 B2

Aoshima et al.        (45) Date of Patent:   *Jul. 14, 2026

(54) CARBON DIOXIDE RECOVERY SYSTEM

(71) Applicant: DENSO CORPORATION, Kariya-city (JP)

(72) Inventors: Hiroki Aoshima, Kariya-city (JP); Yousuke Nakamura, Kariya-city (JP); Hiroyuki Takikawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 616 days.

This patent is subject to a terminal disclaimer.

(21) Appl. No.: 18/295,941

(22) Filed:   Apr. 5, 2023

(65) Prior Publication Data

US 2023/0338894 A1     Oct. 26, 2023

(30) Foreign Application Priority Data

Apr. 25, 2022   (JP) ................................. 2022-071907

(51) Int. Cl.
    *B01D 53/32*     (2006.01)
    *B01D 53/34*     (2006.01)
    *B01D 53/62*     (2006.01)

(52) U.S. Cl.
    CPC ......... B01D 53/326 (2013.01); B01D 53/346 (2013.01); B01D 53/62 (2013.01); *B01D 2256/22* (2013.01); *B01D 2257/504* (2013.01)

(58) Field of Classification Search
    CPC ..... B01D 53/326; B01D 53/965; B01D 53/62
    See application file for complete search history.

(56) References Cited

U.S. PATENT DOCUMENTS

| | | | |
|---|---|---|---|
| 4,840,647 | A | 6/1989 | Hay |
| 2017/0113182 | A1 | 4/2017 | Voskian et al. |
| 2018/0257027 | A1 | 9/2018 | Desai et al. |

(Continued)

FOREIGN PATENT DOCUMENTS

| | | |
|---|---|---|
| CN | 103170227 A | 6/2013 |
| JP | 2021-171727 A | 11/2021 |
| JP | 2022-008288 A | 1/2022 |

OTHER PUBLICATIONS

U.S. Appl. No. 18/295,881, filed Apr. 5, 2023, Aoshima et al.

(Continued)

*Primary Examiner* — Brian W Cohen

(74) *Attorney, Agent, or Firm* — Posz Law Group, PLC

(57)        ABSTRACT

In a carbon dioxide recovery system. an electrochemical cell of a recovery device includes a working electrode having an adsorbent capable of adsorbing carbon dioxide, and a counter electrode paired with the working electrode. A sensor detects a recovery amount that is an amount of carbon dioxide recovered in the recovery device and sent to a carbon dioxide recovery tank. A controller applies a first potential between the electrodes only for an adsorption time period in an adsorption mode such that the adsorbent adsorbs carbon dioxide. The adsorption time period corresponds to a target adsorption amount that is an amount of carbon dioxide that can be adsorbed by the adsorbent. The controller applies a second potential between the electrodes in a recovery mode such that the adsorbed carbon dioxide is desorbed. The controller acquires the target adsorption amount as a correlation value correlated with the detected recovery amount.

13 Claims, 10 Drawing Sheets

INITIALLY CALCULATED THRESHOLD

TARGET ADSORPTION AMOUNT

UPDATED THRESHOLD

NUMBER OF CYCLES

(56) References Cited

U.S. PATENT DOCUMENTS

| | | | |
|---|---|---|---|
| 2020/0023307 A1 | 1/2020 | Voskian et al. |
| 2022/0184552 A1 | 6/2022 | Voskian et al. |
| 2022/0387930 A1 | 12/2022 | Iijima et al. |
| 2024/0001294 A1 | 1/2024 | Aoshima et al. |

OTHER PUBLICATIONS

Voskian, Sahag et al., "Faradaic Electro-Swing Reactive Adsorption for CO2 Capture", Energy & Environmental Science, vol. 12, No. 12, Dec. 4, 2019 (Dec. 4, 2019), pp. 3530-3547, XP055941462, Cambridge ISSN: 1754-5692, DOI: 10.1039/C9EE02412C; Retrieved from the Internet: URL: https://pubs.rsc.org/en/content/articlepdf/2019/ee/c9ee02412c.

Hemmatifar, Ali et al., "Electrochemically Mediated Direct CO2 Capture by a Stackable Bipolar Cell", CHEMSUSCHEM, vol. 15, No. 6, Feb. 15, 2022 (Feb. 15, 2022), XP93075033, DE ISSN: 1864-5631, DOI: 10.1002/cssc.202102533; Retrieved from the Internet: URL: https://onlinelibrary.wiley.com/doi/full-xml/10.1002/cssc.202102533.

Figure 2:
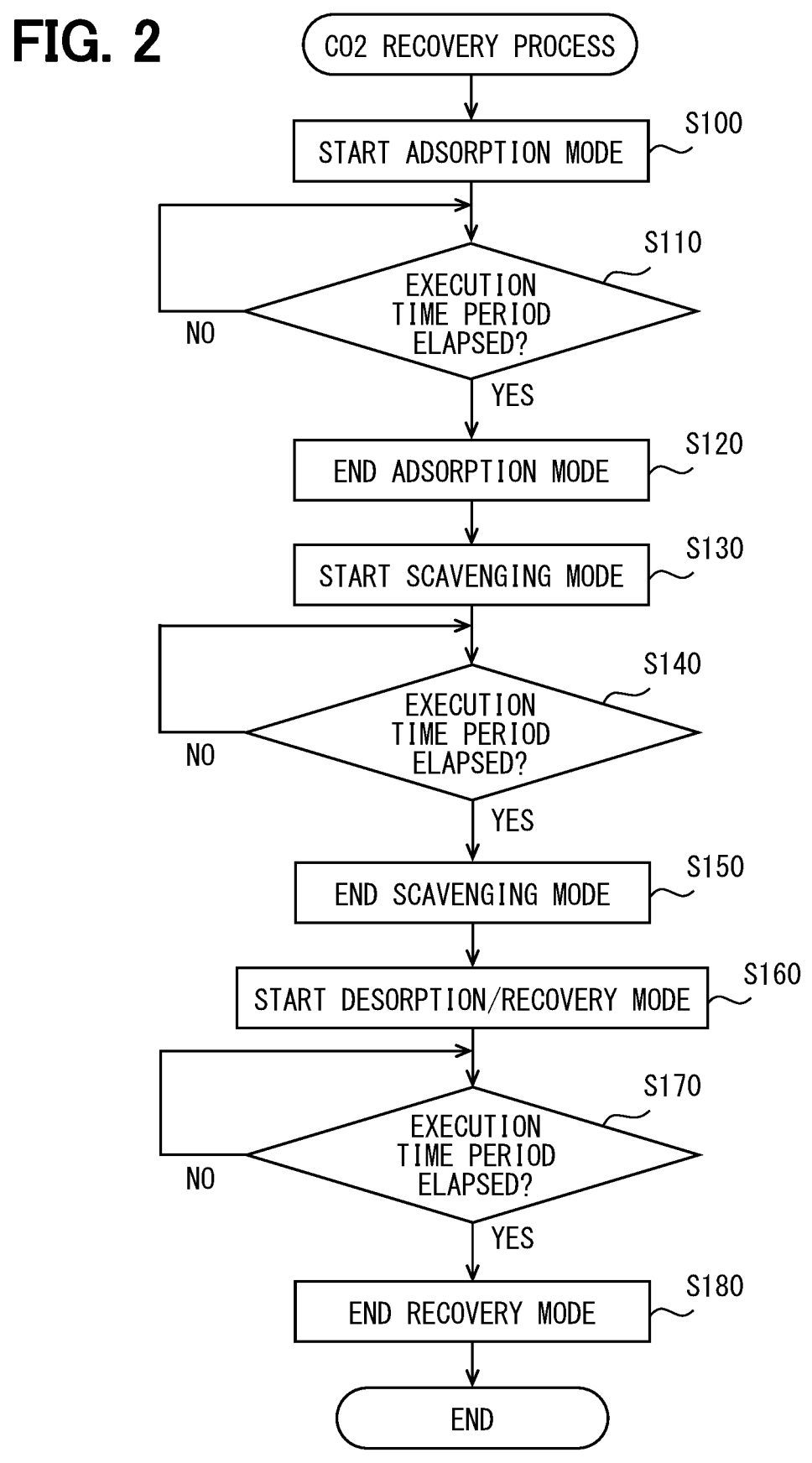

```
        ( CO2 RECOVERY PROCESS )
                   │
                   ▼
      ┌─────────────────────────┐  S100
      │  START ADSORPTION MODE   │
      └─────────────────────────┘
                   │
                   ▼
            ╱─────────────╲  S110
           ╱  EXECUTION    ╲
      NO  ╱  TIME PERIOD    ╲
    ◄─────  ELAPSED?         ─
           ╲                ╱
            ╲─────────────╱
                   │ YES
                   ▼
      ┌─────────────────────────┐  S120
      │   END ADSORPTION MODE    │
      └─────────────────────────┘
                   │
                   ▼
      ┌─────────────────────────┐  S130
      │  START SCAVENGING MODE   │
      └─────────────────────────┘
                   │
                   ▼
            ╱─────────────╲  S140
           ╱  EXECUTION    ╲
      NO  ╱  TIME PERIOD    ╲
    ◄─────  ELAPSED?         ─
           ╲                ╱
            ╲─────────────╱
                   │ YES
                   ▼
      ┌─────────────────────────┐  S150
      │   END SCAVENGING MODE    │
      └─────────────────────────┘
                   │
                   ▼
   ┌──────────────────────────────────┐  S160
   │ START DESORPTION/RECOVERY MODE    │
   └──────────────────────────────────┘
                   │
                   ▼
            ╱─────────────╲  S170
           ╱  EXECUTION    ╲
      NO  ╱  TIME PERIOD    ╲
    ◄─────  ELAPSED?         ─
           ╲                ╱
            ╲─────────────╱
                   │ YES
                   ▼
      ┌─────────────────────────┐  S180
      │    END RECOVERY MODE     │
      └─────────────────────────┘
                   │
                   ▼
               (  END  )
```

FIG. 3

INITIALLY CALCULATED THRESHOLD

TARGET ADSORPTION AMOUNT

HOLDING RANGE

UPDATED THRESHOLD

UPDATE RANGE

CO2 MONITOR VALUE

MAP CREATION PROCESS

RETRY ~S240

S200 — CONDITION SATISFIED?

NO

YES

S210 — CALCULATE SLOPE

S220 — CALCULATE TARGET ADSORPTION AMOUNT

S230 — CALCULATE ADSORPTION TIME PERIOD

END

FIG. 11

CARBON DIOXIDE RECOVERY SYSTEM

CROSS REFERENCE TO RELATED APPLICATION

This application is based on and incorporates herein by reference Japanese Patent Application No. 2022-071907 filed on Apr. 25, 2022.

TECHNICAL FIELD

The present disclosure relates to a carbon dioxide recovery system that recovers carbon dioxide from a mixed gas containing carbon dioxide.

BACKGROUND

A gas separation system that separates carbon dioxide from a mixed gas containing carbon dioxide by an electrochemical reaction.

SUMMARY

According to at least one embodiment of the present disclosure, a carbon dioxide recovery system recovers carbon dioxide from a mixed gas containing carbon dioxide by an electrochemical reaction. The carbon dioxide recovery system includes a carbon dioxide recovery tank, a recovery device, a sensor and a controller. The carbon dioxide recovery tank stores recovered carbon dioxide. The recovery device includes a housing into which the mixed gas is supplied, and an electrochemical cell housed in the housing. The electrochemical cell includes a working electrode having an adsorbent capable of adsorbing carbon dioxide, and a counter electrode paired with the working electrode. The sensor detects a recovery amount that is an amount of carbon dioxide recovered in the recovery device and sent to the carbon dioxide recovery tank. The controller executes an adsorption mode in which carbon dioxide is adsorbed and a recovery mode in which carbon dioxide is recovered. The controller is configured to apply a first potential between the working electrode and the counter electrode only for an adsorption time period in the adsorption mode such that the adsorbent adsorbs carbon dioxide. The adsorption time period corresponds to a target adsorption amount that is an amount of carbon dioxide that can be adsorbed by the adsorbent. The controller is configured to apply a second potential between the working electrode and the counter electrode only for a recovery time period in the recovery mode such that the carbon dioxide adsorbed by the adsorbent is desorbed. The controller is configured to acquire the target adsorption amount as a correlation value correlated with the recovery amount that is a detection result of the sensor.

BRIEF DESCRIPTION OF DRAWINGS

The details of one or more embodiments are set forth in the accompanying drawings and the description below. Other features and advantages will be apparent from the description and drawings, and from the claims.

FIG. 1 is a view showing a configuration of a carbon dioxide recovery system according to an embodiment.

FIG. 2 is a flowchart showing a process in a controller to execute a series of control sequences for carbon dioxide recovery.

FIG. 3 is a time chart showing operation of each unit when the process shown in the flowchart of FIG. 2 is performed.

FIG. 11 is a view showing a configuration of a carbon dioxide recovery system according to a modification.

DETAILED DESCRIPTION

Figures 4A, 4B, 4C:
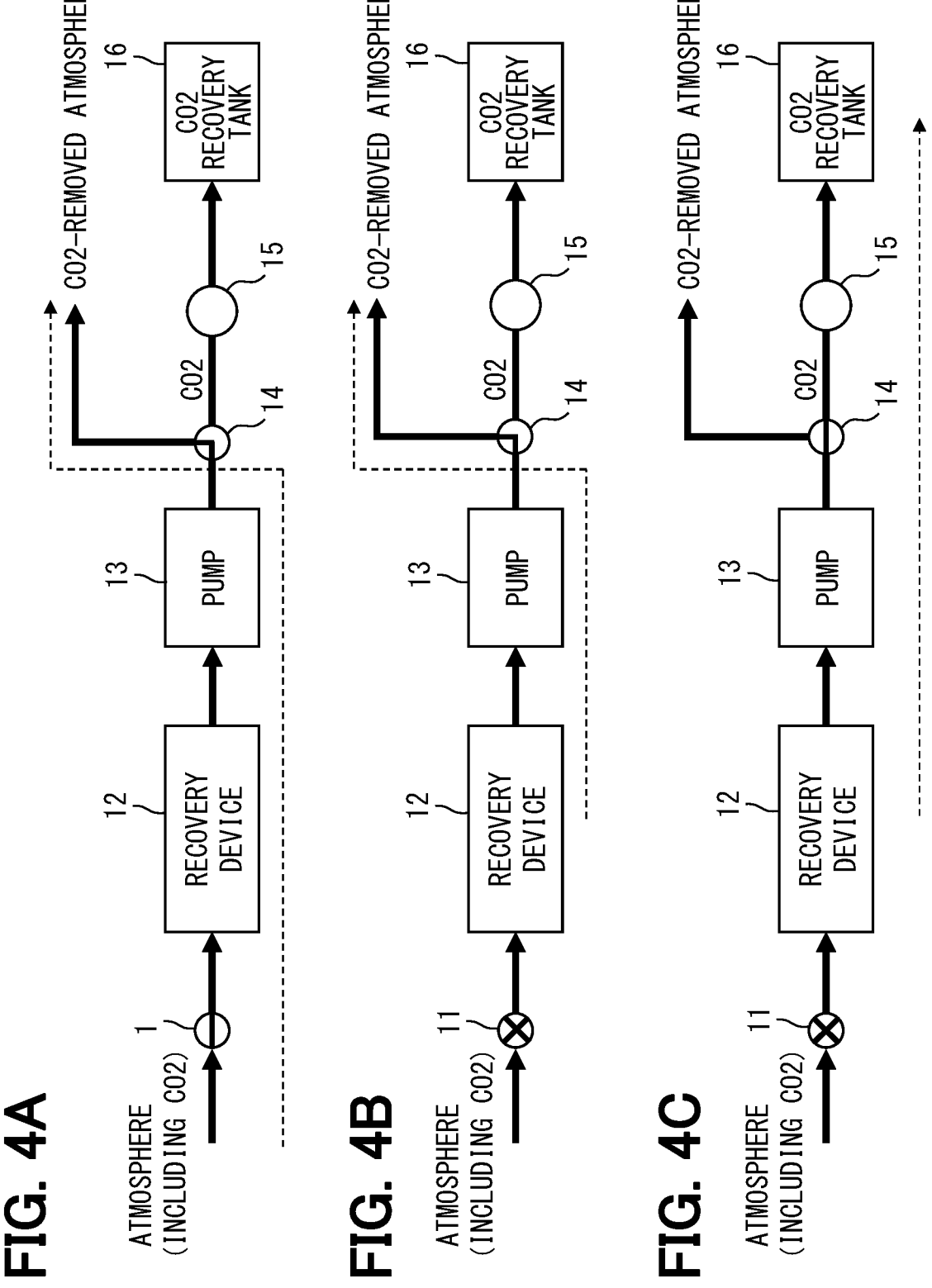
FIG. 4A is an explanatory view for explaining an adsorption mode included in a series of control sequences.
FIG. 4B is an explanatory view for explaining a scavenging mode included in the series of control sequences.
FIG. 4C is an explanatory view for explaining a desorption/recovery mode included in the series of control sequences.

To begin with, examples of relevant techniques will be described. According to a comparative example, a gas separation system separates carbon dioxide from a mixed gas containing carbon dioxide by an electrochemical reaction. In this gas separation system, the mixed gas containing carbon dioxide is introduced into a housing in which an electrochemical cell is disposed. In a charge mode in which electrons are directed to the negative electrode of the electrochemical cell, an electroactive material provided on the negative electrode is reduced. Therefore, the electroactive material on the negative electrode is bonded to carbon dioxide, and the carbon dioxide is separated from the mixed gas. On the other hand, in a discharge mode in which an electron flow is generated in a direction opposite to that in the charge mode, the electroactive material on the negative electrode is oxidized. As a result, carbon dioxide is released from the electroactive material on the negative electrode.

In a carbon dioxide recovery system using an electrochemical cell, an adsorption potential is applied to the electrochemical cell in order to cause the electrochemical cell to adsorb carbon dioxide. In addition, in the carbon dioxide recovery system, in order to reduce an energy loss during adsorption, an application time period of the adsorption potential for obtaining a target adsorption amount may be appropriately controlled with an adsorption amount that can be adsorbed by the electrochemical cell as the target adsorption amount.

In order to appropriately control the application time period of the adsorption potential, it is necessary to grasp the adsorption amount that can be adsorbed by the electrochemical cell. The adsorption amount that can be adsorbed can be grasped, for example, by detecting the concentration of carbon dioxide in ambient air (the atmosphere). However, it has been difficult to grasp the adsorption amount for reasons such as a relatively low concentration of carbon dioxide in ambient air.

In contrast, according to the present disclosure, a carbon dioxide recovery system is capable of grasping an adsorption amount of carbon dioxide that can be adsorbed by an electrochemical cell.

According to an aspect of the present disclosure, a carbon dioxide recovery system recovers carbon dioxide from a mixed gas containing carbon dioxide by an electrochemical reaction. The carbon dioxide recovery system includes a carbon dioxide recovery tank, a recovery device, a sensor and a controller. The carbon dioxide recovery tank stores recovered carbon dioxide. The recovery device includes a housing into which the mixed gas is supplied, and an electrochemical cell housed in the housing. The electrochemical cell includes a working electrode having an adsorbent capable of adsorbing carbon dioxide, and a counter electrode paired with the working electrode. The sensor detects a recovery amount that is an amount of carbon dioxide recovered in the recovery device and sent to the carbon dioxide recovery tank. The controller executes an adsorption mode in which carbon dioxide is adsorbed and a recovery mode in which carbon dioxide is recovered. The controller is configured to apply a first potential between the working electrode and the counter electrode only for an adsorption time period in the adsorption mode such that the adsorbent adsorbs carbon dioxide. The adsorption time period corresponds to a target adsorption amount that is an amount of carbon dioxide that can be adsorbed by the adsorbent. The controller is configured to apply a second potential between the working electrode and the counter electrode only for a recovery time period in the recovery mode such that the carbon dioxide adsorbed by the adsorbent is desorbed. The controller is configured to acquire the target adsorption amount as a correlation value correlated with the recovery amount that is a detection result of the sensor.

As described above, the carbon dioxide recovery system according to the present disclosure includes the controller that detects, through the sensor, the recovery amount of the carbon dioxide recovered in the recovery device and sent to the carbon dioxide recovery tank. Then, the controller acquires the detected recovery amount, and acquires the target adsorption amount as the correlation value correlated with the detected recovery amount. Therefore, the carbon dioxide recovery system can grasp the target adsorption amount of carbon dioxide by the electrochemical cell.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Figure 1:
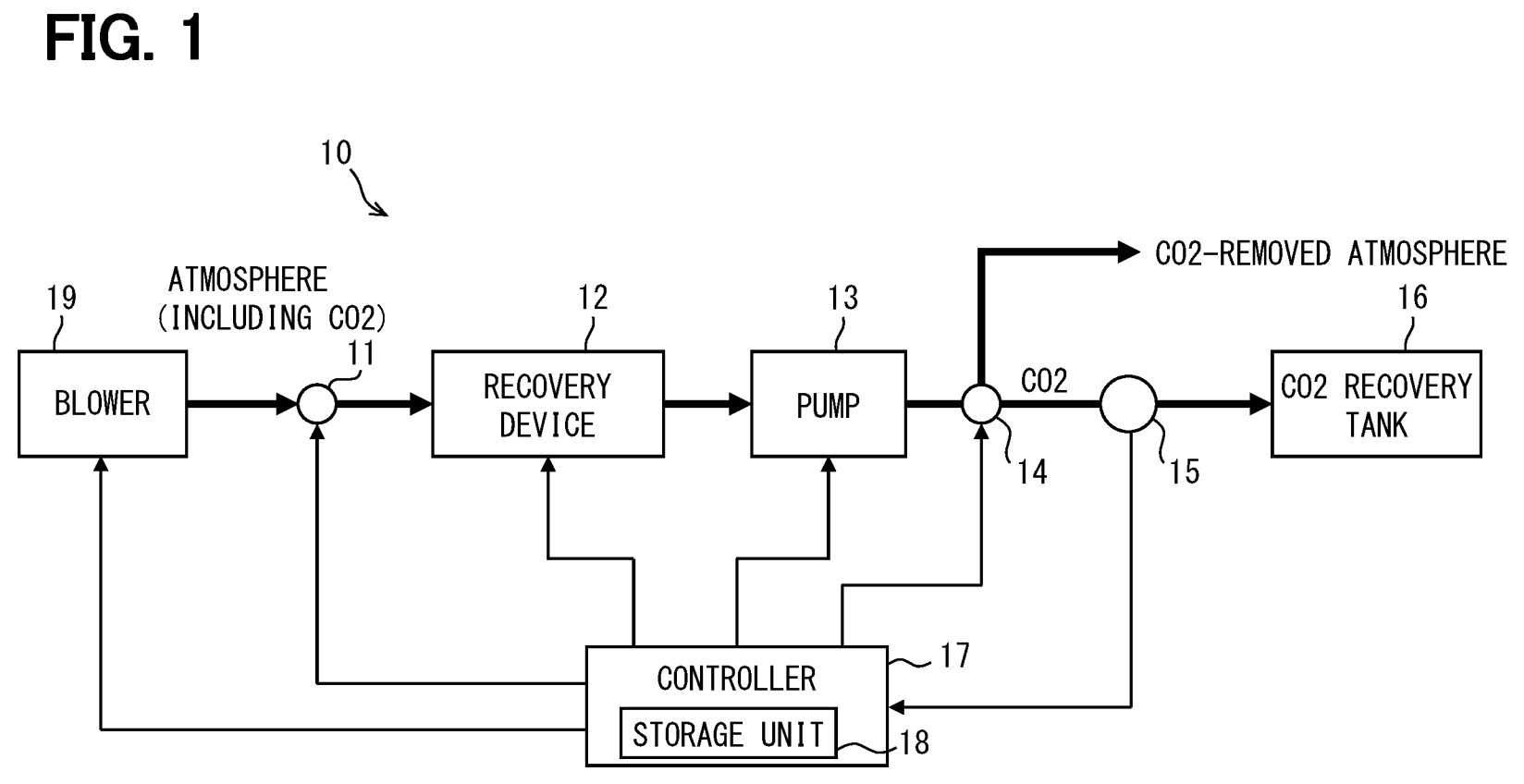

Hereinafter, a carbon dioxide recovery system according to an embodiment of the present disclosure will be described in detail with reference to the drawings. In the drawings, the same or equivalent portions are denoted by the same reference numerals. The carbon dioxide recovery system according to the present embodiment recovers carbon dioxide from a mixed gas (e.g., atmospheric gas) containing carbon dioxide. The mixed gas from which the carbon dioxide has been removed is discharged to the outside (atmosphere). FIG. 1 shows a configuration of a carbon dioxide recovery system 10 according to the present embodiment.

The carbon dioxide recovery system 10 shown in FIG. 1 includes a channel open/close valve 11, a recovery device 12, a pump 13, a channel switching valve 14, a sensor 15, a $CO_2$ recovery tank 16, a controller 17, and a blower 19.

An open-closed state of the channel open/close valve 11 is controlled by the controller 17. When the channel open/close valve 11 is opened, a mixed gas containing carbon dioxide can be introduced into the recovery device 12 through a channel pipe communicating the outside (atmosphere) and the inside of the recovery device 12. On the other hand, when the channel open/close valve 11 is closed, the channel pipe communicating the outside and the inside of the recovery device 12 is blocked, and the recovery device 12 is sealed from the outside.

The blower 19 is driven by the controller 17 when the channel open/close valve 11 is opened, and sends the mixed gas containing carbon dioxide into the recovery device 12 through the channel pipe communicating the outside and the inside of the recovery device 12. However, the blower 19 may be omitted. Alternatively, the pump 13 may also serve as the blower 19. That is, when the channel open/close valve 11 is opened, the pump 13 may be driven such that the mixed gas containing carbon dioxide is drawn into the recovery device 12 from the outside through the channel pipe.

The recovery device 12 includes an electrochemical cell disposed inside a housing made of, for example, a metal. The electrochemical cell can adsorb carbon dioxide by an electrochemical reaction to separate the carbon dioxide from the mixed gas, and desorb the adsorbed carbon dioxide to accumulate the desorbed carbon dioxide in the $CO_2$ recovery tank 16 by the pump 13. The recovery device 12 has two openings. One of the openings is an introduction port for introducing the mixed gas containing carbon dioxide into the housing of the recovery device 12 from the outside. The other of the openings is a discharge port for discharging the mixed gas from which the carbon dioxide has been removed or the carbon dioxide desorbed from the electrochemical cell. The above channel pipe communicating the outside and the inside of the recovery device 12 is connected to the introduction port, and a channel pipe provided with the pump 13 is connected to the discharge port. Note that the inside of the recovery device 12 is the same as the inside of the housing.

A plurality of electrochemical cells are stacked and disposed in the housing of the recovery device 12. The stacking direction of the plurality of electrochemical cells is a direction orthogonal to the flow direction of the mixed gas. Each electrochemical cell is formed in a plate shape, and is disposed such that a plate surface intersects with the stacking direction of the cells. A predetermined gap is provided between the adjacent electrochemical cells. The gap provided between the adjacent electrochemical cells serves as a gas channel through which the mixed gas flows.

Each electrochemical cell is configured by stacking, for example, a working electrode current collecting layer, a working electrode, a separator, a counter electrode, a counter electrode current collecting layer, and the like in the described order. The working electrode is a negative electrode, and the counter electrode paired with the working electrode is a positive electrode. By changing a potential difference to be applied between the working electrode and the counter electrode, electrons can be provided to the working electrode so that a carbon dioxide adsorbent of the working electrode is caused to adsorb carbon dioxide, or electrons can be released from the working electrode so that the carbon dioxide adsorbent is caused to desorb the adsorbed carbon dioxide. The carbon dioxide adsorbent corresponds to an adsorbent.

The working electrode current collecting layer is made of a porous conductive material having pores through which the mixed gas containing carbon dioxide can pass. The working electrode current collecting layer only needs to have gas permeability and conductivity, and as a material for forming the working electrode current collecting layer, for example, a metal material or a carbonaceous material can be used.

The working electrode is formed of a material obtained by mixing the carbon dioxide adsorbent, a conductive substance, a binder, and the like. The carbon dioxide adsorbent has a property of adsorbing carbon dioxide by receiving electrons and desorbing the adsorbed carbon dioxide by releasing electrons. As the carbon dioxide adsorbent, for example, polyanthraquinone can be used. The conductive substance forms a conductive path to the carbon dioxide adsorbent. As the conductive substance, for example, a carbon material, such as a carbon nanotube, carbon black, or graphene, can be used. The binder is for holding the carbon dioxide adsorbent and the conductive substance. As the binder, for example, a conductive resin can be used. As the conductive resin, for example, an epoxy resin containing Ag or the like as a conductive filler, a fluororesin such as polytetrafluoroethylene (PTFE) or polyvinylidene fluoride (PVDF), or the like can be used.

The counter electrode is formed of a material obtained by mixing an electroactive auxiliary material, a conductive substance, a binder, and the like. Since the conductive substance and the binder of the counter electrode are similar to the conductive substance and the binder of the working electrode, description thereof is omitted. The electroactive auxiliary material of the counter electrode is made of a material having an active substance serving as an electron donor. The electroactive auxiliary material of the counter electrode is an auxiliary electroactive species that exchanges electrons with the carbon dioxide adsorbent of the working electrode. As the electroactive auxiliary material, for example, a metal complex capable of exchanging electrons by changing the valence of a metal ion can be used. Examples of such a metal complex include cyclopentadienyl metal complexes such as ferrocene, nickelocene, and cobaltocene, porphyrin metal complexes, and the like. These metal complexes may be polymers or monomers. Similarly to the working electrode current collecting layer, the counter electrode current collecting layer is formed of a conductive material such as a metal material or a carbonaceous material.

The separator is disposed between the working electrode and the counter electrode to separate the working electrode and the counter electrode. The separator is an insulating ion permeable membrane that prevents physical contact between the working electrode and the counter electrode to suppress an electrical short circuit, and causes ions to pass therethrough. As the separator, a cellulose membrane, a polymer, a composite material of a polymer and a ceramic, or the like can be used.

In the electrochemical cell, an electrolyte is provided across the working electrode and the counter electrode. As the electrolyte, for example, an ionic liquid can be used. The ionic liquid is a liquid salt that is non-volatile under normal temperature and pressure.

The pump 13 sucks the residual mixed gas left in the recovery device 12 from the recovery device 12 and discharges the mixed gas to the outside (i.e., scavenges the residual mixed gas in the recovery device 12). And, when the carbon dioxide adsorbed by the carbon dioxide adsorbent is desorbed, the pump 13 sucks the desorbed carbon dioxide from the recovery device 12 and discharges the carbon dioxide toward the $CO_2$ recovery tank 16. When the pump 13 scavenges the residual mixed gas in the recovery device 12, the channel open/close valve 11 blocks the channel pipe communicating the outside and the inside of the recovery device 12. Therefore, the scavenging of the residual mixed gas in the recovery device 12 is performed by evacuation by the pump 13. In addition, the subsequent discharge of the carbon dioxide to the $CO_2$ recovery tank 16 is also performed in a state closer to a vacuum than the atmosphere.

The channel switching valve 14 is a three-way valve that switches the channel for a gas flowing through the pipe on the downstream side of the pump 13. Switching the channel of the channel switching valve 14 is controlled by the controller 17. Specifically, when the mixed gas containing carbon dioxide is introduced into the recovery device 12 and when the residual mixed gas in the recovery device 12 is scavenged by the pump 13, the controller 17 controls the channel switching valve 14 such that the pipe on the downstream side of the pump 13 communicates with the outside (atmosphere). As a result, the mixed gas from which the carbon dioxide has been removed and the residual mixed gas in the recovery device 12 are released to the outside. On the other hand, when the carbon dioxide adsorbent desorbs the adsorbed carbon dioxide and when the pump 13 sucks the desorbed carbon dioxide from the recovery device 12 and discharges the carbon dioxide, the controller 17 controls the channel open/close valve 11 such that the pipe on the downstream side of the pump 13 communicates with the $CO_2$ recovery tank 16 side. As a result, the carbon dioxide recovered by the recovery device 12 can be accumulated in the $CO_2$ recovery tank 16.

The sensor 15 detects the carbon dioxide concentration and the flow rate of the gas flowing through the pipe connected to the $CO_2$ recovery tank 16 at predetermined time intervals. The controller 17 can calculate (detect), from the carbon dioxide concentration and the flow rate detected by the sensor 15, the recovery amount of the carbon dioxide recovered in the $CO_2$ recovery tank 16. This carbon dioxide recovery amount corresponds to a detection result through the sensor. The carbon dioxide recovery amount may be calculated by the sensor 15. In this case, the sensor 15 outputs the carbon dioxide recovery amount to the controller 17. The carbon dioxide recovery amount can also be said to be a carbon dioxide monitor value. The carbon dioxide recovery amount corresponds to a recovery amount.

Figure 5:
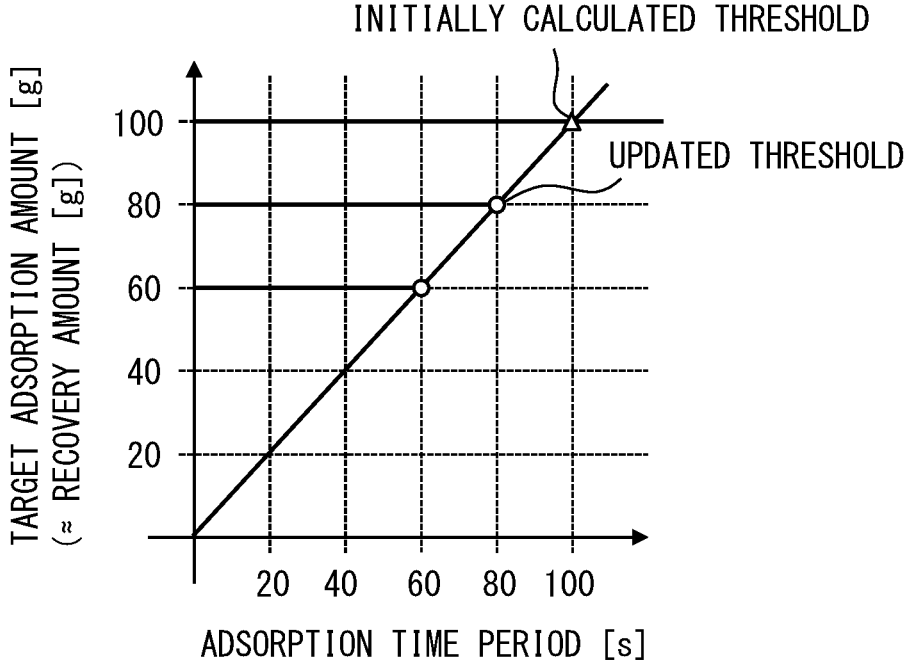
FIG. 5 is a graph showing an example of adsorption amount change map data.
Figure 6:
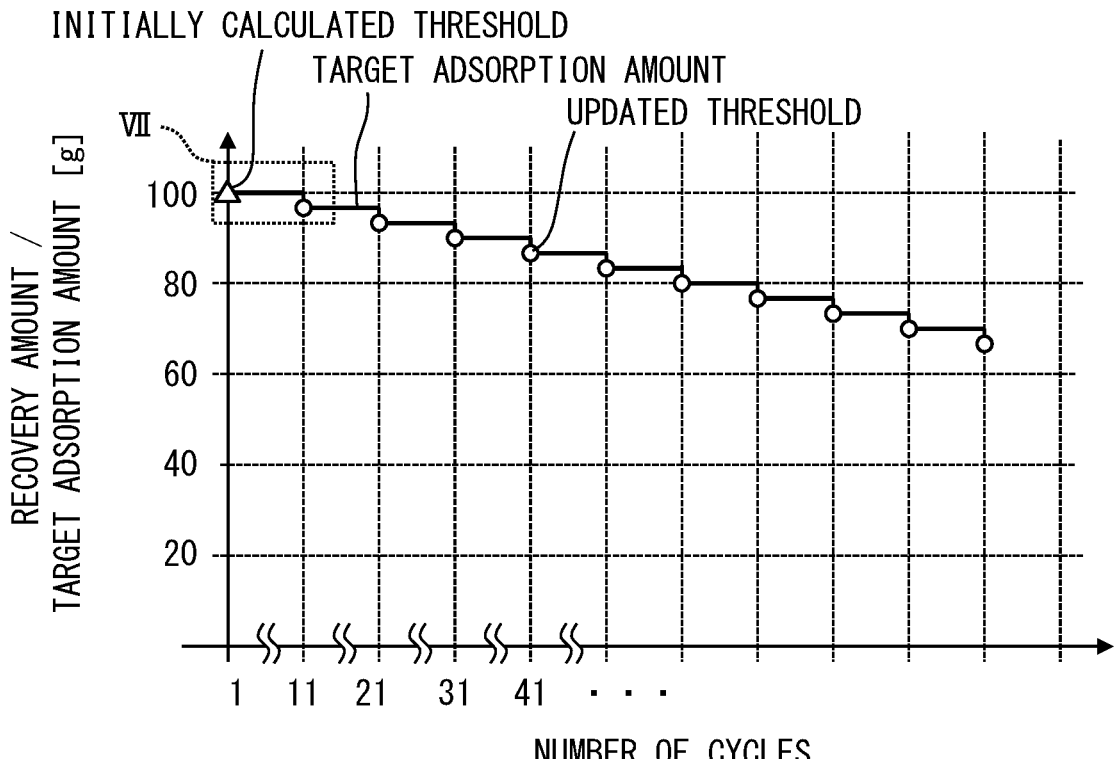
FIG. 6 is a graph showing an example of recovery amount change map data.
Figure 7:
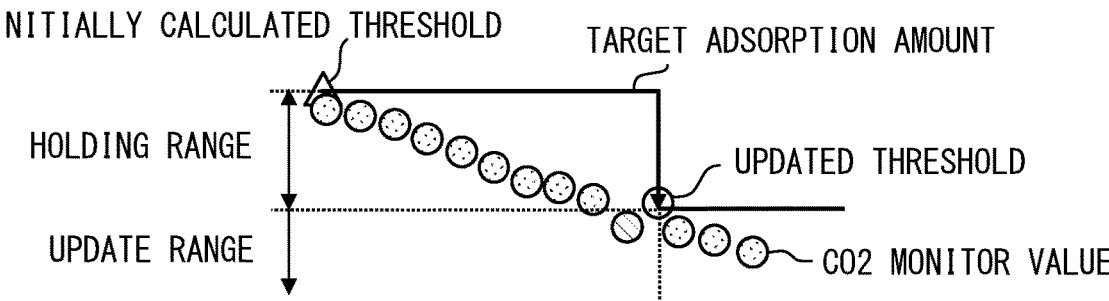
FIG. 7 is an enlarged graph of a portion VII in FIG. 6.

The controller 17 includes a known microcomputer including a CPU, a ROM, a RAM, and the like, and peripheral devices thereof. The peripheral devices include a storage unit 18 having a storage medium. The storage unit 18 stores adsorption amount change map data and recovery amount change map data. The adsorption amount change map data corresponds to adsorption-amount change data. The recovery amount change map data corresponds to recovery-amount change data. In the adsorption amount change map data, an adsorption time period is associated with a target carbon dioxide adsorption amount, as shown in FIG. 5. In the recovery amount change map data, a change in the carbon dioxide recovery amount is associated with the target carbon dioxide adsorption amount, as shown in FIGS. 6 and 7. The target carbon dioxide adsorption amount is also referred to as a maximum adsorption amount. The adsorption time period is also referred to as an adsorption mode execution time period. The adsorption amount change map data and the recovery amount change map data will be described in detail later.

The controller 17 performs various arithmetic processing on the basis of a control program stored in the storage medium such as a ROM, and controls operations of various control target devices such as the channel open/close valve 11, the recovery device 12, the pump 13, the channel switching valve 14, and the blower 19. The controller 17 of the present embodiment controls the operations of the various control target devices such that, in the carbon dioxide recovery system 10, a series of control sequences for carbon dioxide recovery, including at least an adsorption mode and a desorption/recovery mode, is executed. Note that the control sequences may include a scavenging mode in addition to the above. The desorption/recovery mode indicates that a desorption mode and a recovery mode are defined as one mode.

Figure 3:
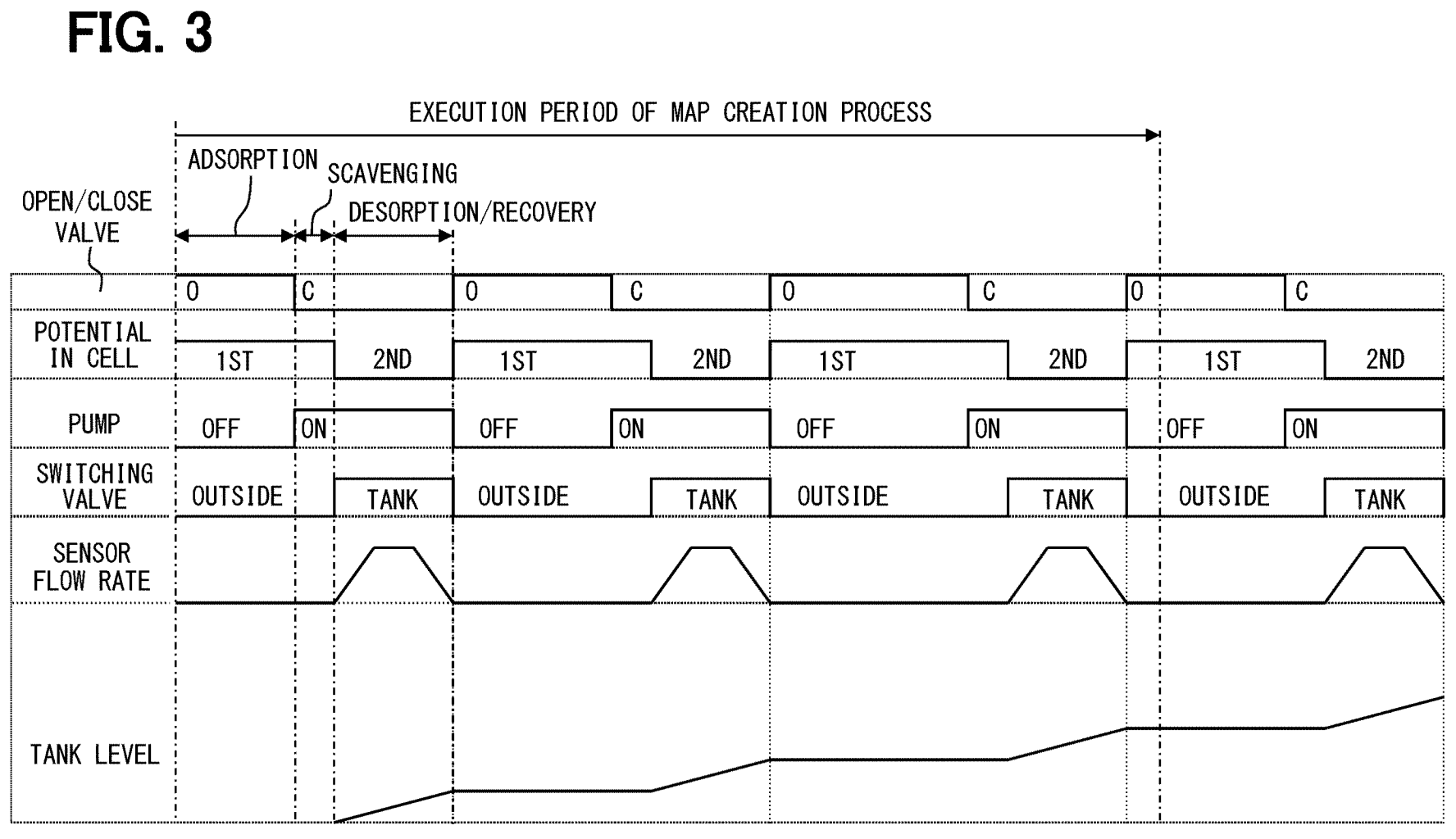

Hereinafter, the series of control sequences for carbon dioxide recovery, including at least an adsorption mode, a scavenging mode, and a desorption/recovery mode, that is executed in the carbon dioxide recovery system 10 will be described. FIG. 2 is a flowchart showing a process performed in the controller 17 to execute the control sequences. FIG. 3 is a time chart showing operation of each unit when the process shown in the flowchart of FIG. 2 is performed. FIG. 4 are explanatory views for explaining the adsorption mode, the scavenging mode, and the desorption/recovery mode included in the series of control sequences.

As shown in the flowchart of FIG. 2, the controller 17 first starts, in a step S100, the adsorption mode that is the first operation mode of the series of control sequences. In this adsorption mode, the channel open/close valve 11 is opened such that the mixed gas containing carbon dioxide can be introduced into the recovery device 12, as shown in FIG. 3. In a case where the blower 19 is provided, the blower 19 is driven such that more mixed gas is introduced into the recovery device 12. In a case where the pump 13 also serves as the blower 19, the pump 13 is driven to suck the mixed gas, so that the mixed gas is drawn into the recovery device 12 from the outside. In this case, the pump 13 is driven only to suck the mixed gas from the outside, so that the energy required for the suction is less than that required for pump drive for the evacuation in the scavenging mode or the desorption/recovery mode to be described later.

In the adsorption mode, an adsorption potential (corresponding to a first potential), at which the carbon dioxide adsorbent of the working electrode can adsorb carbon dioxide, is applied between the working electrode and the counter electrode of the electrochemical cell of the recovery device 12, as shown in FIG. 3. Furthermore, in the adsorption mode, the channel switching valve 14 is controlled such that the pipe on the downstream side of the pump 13 communicates with the outside, as shown in FIG. 3.

By such control of the channel open/close valve 11, the electrochemical cell of the recovery device 12, the channel switching valve 14, and the like, the mixed gas (atmospheric gas) containing carbon dioxide passes through the channel open/close valve 11 and enters the recovery device 12 in the adsorption mode, as shown by a dotted arrow in FIG. 4A. The carbon dioxide in the mixed gas that has entered the recovery device 12 is adsorbed by the plurality of the electrochemical cells, whereby carbon dioxide is removed from the mixed gas. The mixed gas, from which the carbon dioxide has been removed, passes through the pump 13, is guided to a channel pipe leading toward the outside at the channel switching valve 14, and is discharged to the outside through the channel pipe.

In a step S110 in the flowchart of FIG. 2, the controller 17 determines whether the adsorption mode execution time period has elapsed. The adsorption mode execution time period is not constant but changes for the reasons: for estimating, in the later-described map creation process, a maximum adsorption amount of the electrochemical cell and a maximum adsorption amount time period that is the adsorption mode execution time period to obtain the maximum adsorption amount; for optimizing the carbon dioxide recovery amount and consumed energy if the carbon dioxide adsorption performance of the electrochemical cell changes due to environmental changes or deterioration over time; and for others. This changing adsorption mode execution time period is set by the controller 17. In the step S110, it is determined whether the set adsorption mode execution time period has elapsed. In the present embodiment, the maximum adsorption amount is used as the target carbon dioxide adsorption amount. Therefore, the maximum adsorption amount is also referred to as the target carbon dioxide adsorption amount in the following description. The maximum adsorption amount corresponds to the target adsorption amount.

When it is determined in the determination processing in the step S110 that the set adsorption mode execution time period has elapsed, the process proceeds to a step S120. On the other hand, when it is determined that the set adsorption mode execution time period has not elapsed, the determination processing in the step S110 is repeatedly executed until the adsorption mode execution time period elapses.

In the step S120, adsorption mode end processing is executed. Specifically, the controller 17 closes the channel open/close valve 11 to block the mixed gas that will flow into the recovery device 12 from the outside. In the case where the blower 19 is provided, the controller 17 stops the driving of the blower 19. The controller 17 also resets a count value of a counter that counts the adsorption mode execution time period, and the like.

As described above, the controller 17 applies the adsorption potential during the execution of the adsorption mode in which carbon dioxide is adsorbed, so that the carbon dioxide adsorbent adsorbs carbon dioxide. The controller 17 applies the adsorption potential only during the adsorption mode execution time period corresponding to the target carbon dioxide adsorption amount.

The adsorption mode execution time period can be obtained from the adsorption amount change map data. The target carbon dioxide adsorption amount can be obtained from the recovery amount change map data. The controller 17 acquires, from the recovery amount change map data, the target carbon dioxide adsorption amount associated with the carbon dioxide recovery amount detected through the sensor 15. As shown in FIG. 7, the target carbon dioxide adsorption amount in the recovery amount change map data is a correlation value correlated with the carbon dioxide recovery amount detected through the sensor 15. Therefore, it can be said that the controller 17 acquires, as the target carbon dioxide adsorption amount, a correlation value correlated with the carbon dioxide recovery amount detected through the sensor 15.

Then, the controller 17 acquires the adsorption mode execution time period associated with the target carbon dioxide adsorption amount from the adsorption amount change map data. In the example of FIG. 5, when the target carbon dioxide adsorption amount is set, for example, to 80 [g], the adsorption mode execution time period is 80 [s].

As shown in FIG. 6, the target carbon dioxide adsorption amount is updated according to the carbon dioxide recovery amount detected through the sensor 15. As shown in FIG. 5, the adsorption mode execution time period changes every time the target carbon dioxide adsorption amount is updated. The target carbon dioxide adsorption amount may be stored in the storage unit 18 or the like as an initially calculated threshold value or an updated threshold value.

In a step S130, the controller 17 starts the scavenging mode that is the second operation mode of the series of control sequences. In this scavenging mode, the channel open/close valve 11 remains closed, as shown in FIG. 3. The adsorption potential applied between the working electrode and the counter electrode of the electrochemical cell of the recovery device 12 is maintained as it is. The communication between the pipe on the downstream side of the pump 13 and the outside by the channel switching valve 14 is also maintained.

In the scavenging mode, driving of the pump 13 is started as shown in FIG. 3. As described above, the channel open/close valve 11 is closed, so that the recovery device 12 is in a sealed state on the upstream side of the pump 13. When the pump 13 is driven in this state, the residual mixed gas left in the sealed recovery device 12, from which the carbon dioxide has been removed, is sucked from the inside of the recovery device 12 and discharged to the outside. As a result, the residual mixed gas in the recovery device 12 can be scavenged. In the scavenging mode, the adsorption potential is applied.

Since the recovery device 12 on the upstream side of the pump 13 is sealed, the scavenging of the residual mixed gas in the recovery device 12 is performed by evacuation by the pump 13. Therefore, for example, in the case where the pump 13 also serves as the blower 19, the driving of the pump 13 is continued, but the drive output thereof is made higher than that in an intake mode by the start of the scavenging mode.

By such control of the channel open/close valve 11, the electrochemical cell of the recovery device 12, the pump 13, and the channel switching valve 14 in the scavenging mode, the residual mixed gas in the recovery device 12, from which the carbon dioxide has been removed, passes through the pump 13, is guided to the channel pipe leading toward the outside at the channel switching valve 14, and is discharged to the outside through the channel pipe, as shown by a dotted arrow in FIG. 4B.

In a step S140 in the flowchart of FIG. 2, the controller 17 determines whether a scavenging mode execution time period has elapsed. The scavenging mode execution time period is predetermined to a time period sufficient to scavenge the residual mixed gas in the recovery device 12.

When it is determined in the determination processing in the step S140 that the predetermined scavenging mode execution time period has elapsed, the process proceeds to a step S150. On the other hand, when it is determined that the set scavenging mode execution time period has not elapsed, the determination processing in the step S140 is repeatedly executed until the scavenging mode execution time period elapses.

In the step S150, scavenging mode end processing is executed. Specifically, the controller 17 resets a count value of a counter that counts the scavenging mode execution time period, and the like.

In a step S160, the controller 17 starts the desorption/recovery mode that is the third operation mode of the series of control sequences. In this desorption/recovery mode, the channel open/close valve 11 is maintained in a closed state, as shown in FIG. 3. In addition, the pump 13 sucks the carbon dioxide desorbed from the electrochemical cell in a state closer to a vacuum than the atmosphere, so that the driving by the drive output equivalent to that in the scavenging mode is continued.

On the other hand, a desorption potential (corresponding to a second potential), at which the carbon dioxide adsorbed by the carbon dioxide adsorbent of the working electrode can be desorbed by releasing electrons from the working electrode, is applied between the working electrode and the counter electrode of the electrochemical cell of the recovery device 12. Furthermore, in the desorption/recovery mode, the channel switching valve 14 is controlled to cause the pipe on the downstream side of the pump 13 to communicate with the $CO_2$ recovery tank 16, as shown in FIG. 3.

By such control of the channel open/close valve 11, the electrochemical cell of the recovery device 12, the pump 13, and the channel switching valve 14 in the desorption/recovery mode, the carbon dioxide desorbed from the electrochemical cell passes through the pump 13, is guided to a channel pipe leading toward the $CO_2$ recovery tank 16 at the channel switching valve 14, and is accumulated in the $CO_2$ recovery tank 16 through the channel pipe, as shown by a dotted arrow in FIG. 4C. At this time, the concentration and flow rate of the carbon dioxide flowing through the channel pipe toward the $CO_2$ recovery tank 16 are detected by the sensor 15. Based on the detection results by the sensor 15, the controller 17 can calculate the recovery amount of the carbon dioxide recovered in the $CO_2$ recovery tank 16 by executing the series of control sequences. The concentration of the carbon dioxide flowing through the channel pipe toward the $CO_2$ recovery tank 16 is usually close to 100%. Therefore, a sensor 15 capable of detecting a flow rate of carbon dioxide may be used.

In the desorption/recovery mode, instead of simultaneous performing of the desorption/recovery of the carbon dioxide, priority may be given to the desorption of the carbon dioxide from the electrochemical cell, and after a predetermined time period has elapsed from the desorption of the carbon dioxide, the recovery of the desorbed carbon dioxide may be started. That is, by separating the desorption mode and the recovery mode and delaying the execution start time of the recovery mode from the execution start time of the desorption mode, the execution time period of the recovery mode may be shortened from the execution time period of the desorption mode. In this case, the driving of the pump 13 is temporarily stopped at the start of the desorption mode. Then, while the pump 13 is stopped, the desorption potential is applied between the working electrode and the counter electrode of the electrochemical cell to desorb carbon dioxide from the carbon dioxide adsorbent of the working electrode. In a state where a predetermined time period has elapsed from the start of the desorption mode and the desorption of the carbon dioxide has progressed to some extent, the recovery mode is started and the pump 13 is driven again. As a result, the pump 13 only needs to be driven in the recovery mode, so that the pump 13 can be efficiently driven. However, even in the recovery mode in which the pump 13 is driven, the desorption potential is applied between the working electrode and the counter electrode of the electrochemical cell, and the desorption of the carbon dioxide from the electrochemical cell is continued.

In a step S170 in the flowchart of FIG. 2, the controller 17 determines whether a desorption/recovery mode execution time period or a recovery mode execution time period (hereinafter, it is described as a recovery mode execution time period) has elapsed. The recovery mode execution time period is not constant but changes for the reasons: for optimizing the carbon dioxide recovery amount and consumed energy if the carbon dioxide adsorption performance of the electrochemical cell changes due to environmental changes or deterioration over time; and for others. The changing recovery mode execution time period is set by the controller 17. In the step S170, it is determined whether the set recovery mode execution time period has elapsed.

When it is determined in the determination processing in the step S170 that the set recovery mode execution time period has elapsed, the process proceeds to step a S180. On the other hand, when it is determined that the set recovery mode execution time period has not elapsed, the determination processing in the step S170 is repeatedly executed until the recovery mode execution time period elapses. As described above, the controller 17 applies the desorption potential during the execution of the recovery mode in which carbon dioxide is recovered, so that the carbon dioxide adsorbed by the carbon dioxide adsorbent is desorbed. Then, the controller 17 applies the desorption potential only during the recovery mode execution time period corresponding to the target carbon dioxide adsorption amount. The recovery mode execution time period corresponds to a recovery time period.

In the step S180, recovery mode end processing is executed. Specifically, the controller 17 opens the channel open/close valve 11 to cause the recovery device 12 to communicate with the outside. The controller 17 stops the application of the desorption potential to the electrochemical cell. The controller 17 stops the driving of the pump 13. The controller 17 switches the channel switching valve 14 to cause the pipe on the downstream side of the pump 13 to communicate with the outside. Furthermore, the controller 17 also resets a count value of a counter that counts the recovery mode execution time period, and the like.

Here, it is considered that the carbon dioxide adsorption performance of the electrochemical cell changes due to deterioration over time or the like. However, an upper limit amount that the electrochemical cell can adsorb carbon dioxide cannot be directly detected. Therefore, it cannot be denied the possibility that the execution of the adsorption mode may be continued even though the carbon dioxide adsorption amount of the electrochemical cell reaches the upper limit, or the execution of the recovery mode may be continued even though the recovery of the carbon dioxide desorbed from the electrochemical cell is substantially finished.

As described above, for example, if the adsorption mode is always executed for a time period sufficient to adsorb the upper limit amount of carbon dioxide that can be adsorbed by the electrochemical cell and the recovery mode is executed for a time period sufficient to recover all the carbon dioxide adsorbed by the electrochemical cell in order to maximize the recovery amount of carbon dioxide, there is the possibility that, in the carbon dioxide recovery system 10, excessive energy may be consumed with respect to the recovery amount of carbon dioxide.

Therefore, the carbon dioxide recovery system 10 according to the present embodiment has a configuration in which the adsorption amount change map data and the recovery amount change map data are stored in the storage unit 18 of the controller 17.

Figure 8:
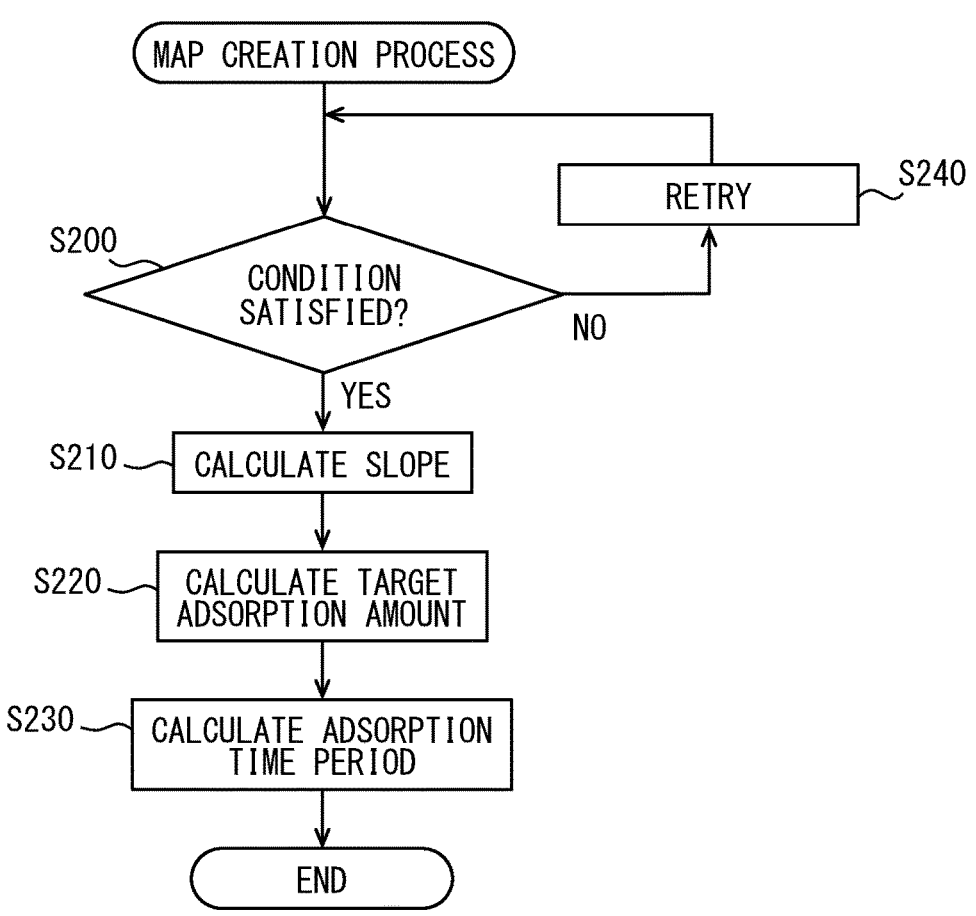
FIG. 8 is a flowchart showing a map creation process for creating the adsorption amount change map data.

Hereinafter, the adsorption amount change map data and the recovery amount change map data will be described in detail. First, a map creation process of creating the adsorption amount change map data will be described based on the flowchart of FIG. 8.

When performing the map creation process, the controller 17 causes multiple times of the adsorption mode to be executed at different adsorption mode execution time periods (elapsed time periods), and detects, through the sensor 15, the carbon dioxide recovery amounts in multiple times of the recovery mode executed corresponding to each adsorption mode. For example, FIG. 3 shows an example in which three times of adsorption mode are executed at different adsorption mode execution time periods. The number of times of execution of the multiple times of the adsorption mode may be two.

In FIG. 3, the execution time period of the first adsorption mode is set to be relatively short such that the carbon dioxide adsorption amount of the electrochemical cell does not reach the upper limit value. Therefore, the carbon dioxide recovery amount, detected when the recovery mode corresponding to the first adsorption mode is executed, is an amount less than the upper limit value of the carbon dioxide adsorption amount of the electrochemical cell.

The execution time period of the second adsorption mode is set to be relatively long such that the carbon dioxide adsorption amount of the electrochemical cell reaches substantially the upper limit value. Therefore, the carbon dioxide recovery amount, detected when the recovery mode corresponding to the second adsorption mode is executed, is an amount substantially equal to the upper limit value of the carbon dioxide adsorption amount of the electrochemical cell.

The execution time period of the third adsorption mode is set to be the longest such that, even after the carbon dioxide adsorption amount of the electrochemical cell reaches the upper limit value, the adsorption mode is executed for a certain period of time. Therefore, the carbon dioxide recovery amount, detected when the recovery mode corresponding to the third adsorption mode is executed, is an amount equal to the upper limit value of the carbon dioxide adsorption amount of the electrochemical cell.

Based on the sensor detection results during the execution of the multiple times of the adsorption mode and the multiple times of the recovery mode corresponding to the each adsorption mode, a maximum adsorption amount of the electrochemical cell and a maximum adsorption amount time period, which is an adsorption mode execution time period to obtain the maximum adsorption amount, are estimated. A specific example of a method for estimating the maximum adsorption amount of the electrochemical cell and the maximum adsorption amount time period will be described with reference to FIGS. 9A, 9B, and 9C.

In a step S200, it is determined whether a map creation determination condition is satisfied. The map creation determination condition is satisfied when the carbon dioxide recovery amounts in the three recovery modes can be plotted for a single piece of the adsorption amount change map data, and a non-plotted maximum value of the carbon dioxide recovery amount exists on the same straight line. The same straight line may include a tolerance. When the controller 17 determines that the map creation determination condition is satisfied, the process proceeds to a step S210. When the controller 17 determines that the map creation determination condition is not satisfied, the process proceeds to a step S240.

In the step S240, retry is performed. The controller 17 causes the adsorption mode to be executed again, and detects, through the sensor 15, the carbon dioxide recovery amount in the recovery mode executed corresponding to the adsorption mode. At this time, the controller 17 sets the execution time period of the adsorption mode to be longer than the last time (third time).

Then, the controller 17 performs S200 using the carbon dioxide recovery amount obtained in the retry. The controller 17 repeatedly executes the steps S200 and S240 until YES is determined in the step S200. When the step S240 is executed, the controller 17 adopts, in a step S220, the carbon dioxide recovery amount at the time of the retry as the target carbon dioxide adsorption amount.

Figure 9A:
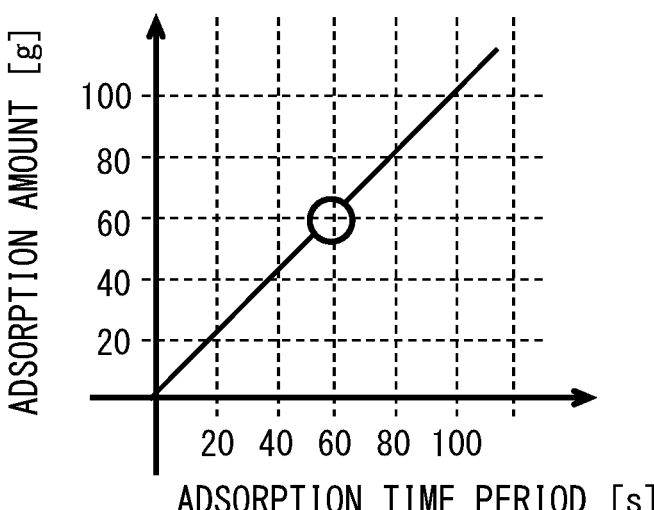
FIG. 9A is an explanatory graph for determining an increasing gradient line in estimation of a maximum adsorption amount of an electrochemical cell and a maximum adsorption amount time period.

In the step S210, a slope is calculated. FIG. 9A is a graph showing, based on the carbon dioxide recovery amount detected when the recovery mode corresponding to the first adsorption mode is executed, the carbon dioxide adsorption amount of the electrochemical cell and the execution time period of the first adsorption mode. The carbon dioxide adsorption amount of the electrochemical cell can be regarded as equal to the detected carbon dioxide recovery amount. As described above, the execution time period of the first adsorption mode is set to be relatively short such that the carbon dioxide adsorption amount of the electrochemical cell does not reach the upper limit value. Therefore, by assuming, based on the carbon dioxide adsorption amount of the electrochemical cell when the first adsorption mode is executed, that as the execution time period of the adsorption mode becomes longer, the carbon dioxide adsorption amount also linearly increases, an increasing gradient line (slope) can be determined, as shown in FIG. 9A.

Figure 9B:
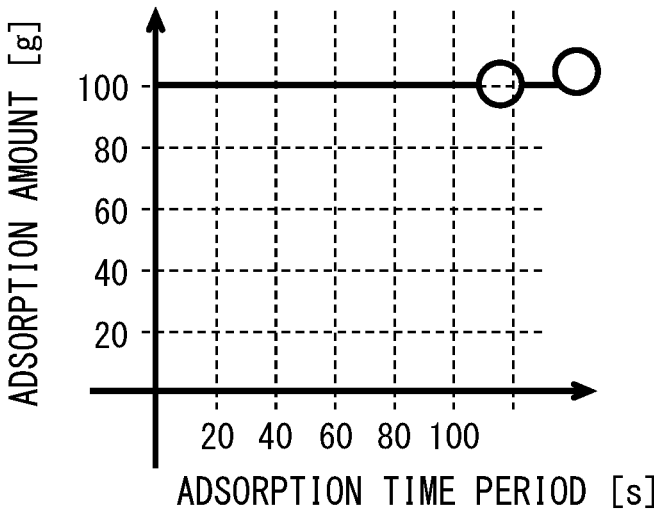
FIG. 9B is an explanatory graph for determining an upper limit line of an carbon dioxide adsorption amount in the estimation.

In the step S220, the target carbon dioxide adsorption amount is calculated. FIG. 9B is a graph showing, based on the carbon dioxide recovery amount detected when the recovery mode corresponding to each of the second and third adsorption modes is executed, the carbon dioxide adsorption amount of the each electrochemical cell and the execution time period of each of the second and third adsorption modes. As described above, the execution time period of the second adsorption mode is set to be relatively long such that the carbon dioxide adsorption amount of the electrochemical cell reaches substantially the upper limit value, and the execution time period of the third adsorption mode is set to be the longest such that, even after the carbon dioxide adsorption amount of the electrochemical cell reaches the upper limit value, the adsorption mode is executed for a certain period of time. Therefore, based on the carbon dioxide adsorption amount of the electrochemical cell when each of the second and third adsorption modes is executed, an upper limit line of the carbon dioxide adsorption amount of the electrochemical cell can be determined, as shown in FIG. 9B. The carbon dioxide adsorption amount corresponding to the upper limit line is the target carbon dioxide adsorption amount that is the maximum adsorption amount that can be adsorbed.

The upper limit line of the carbon dioxide adsorption amount of the electrochemical cell may be determined based on the carbon dioxide adsorption amount of the electrochemical cell that can be obtained through the execution of one time of the adsorption mode and the recovery mode corresponding to the one time of the adsorption mode.

Figure 9C:
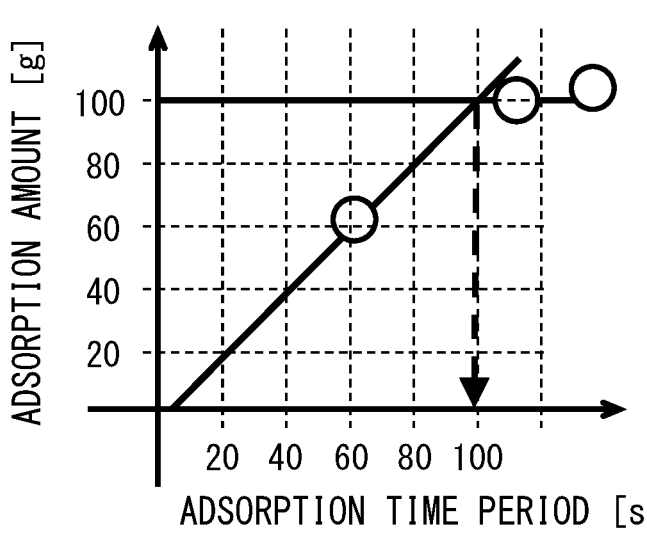
FIG. 9C is an explanatory graph for determining an intersection between the increasing gradient line and the upper limit line in the estimation.

In a step S230, the adsorption time period, which is the maximum adsorption amount time period that is the adsorption mode execution time period corresponding to the maximum adsorption amount, can be determined from the intersection between the increasing gradient line in FIG. 9A and the upper limit line in FIG. 9B, as shown in FIG. 9C.

As described above, the controller 17 creates, based on the carbon dioxide recovery amounts that are the detection results in the multiple times of the recovery mode, the adsorption-amount change data by estimating the maximum adsorption amount of the electrochemical cell as the target carbon dioxide adsorption amount and estimating the adsorption time period corresponding to the maximum adsorption amount. Then, the controller 17 stores the created adsorption amount change map data in the storage unit 18. In the adsorption amount change map data, the target carbon dioxide adsorption amount and the adsorption time period are updated due to deterioration over time or the like of the electrochemical cell.

Figure 10:
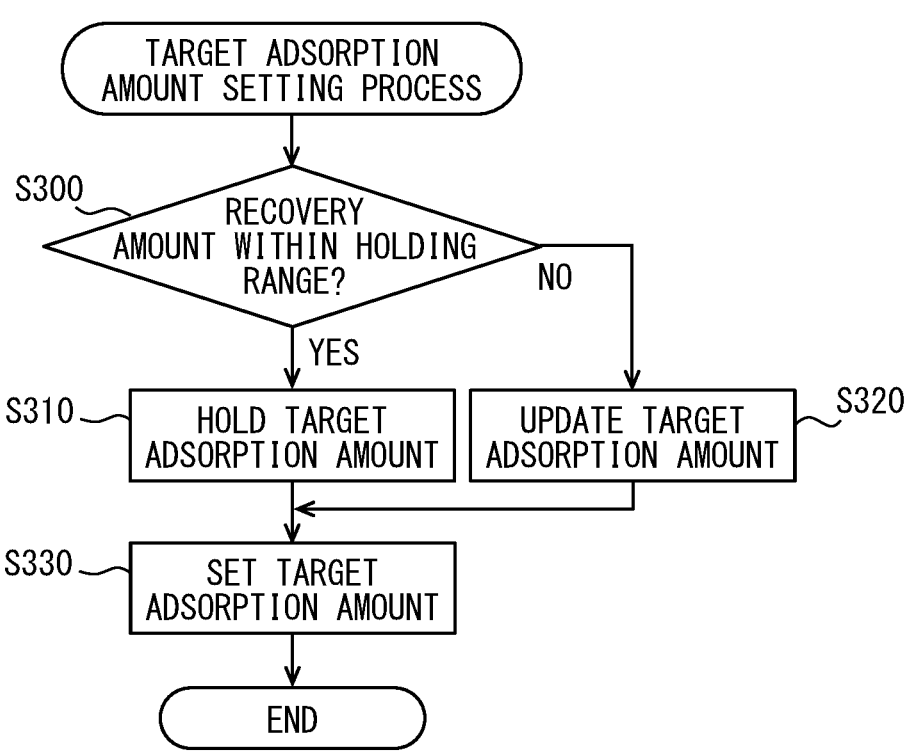
FIG. 10 is a flowchart showing a setting process for a target carbon dioxide adsorption amount.

Next, a setting process for the target carbon dioxide adsorption amount in the recovery amount change map data will be described based on the flowchart of FIG. 10. The controller 17 executes the flowchart of FIG. 10 to determine whether the target carbon dioxide adsorption amount is maintained to the current value or updated.

In the recovery amount change map data, a different target carbon dioxide adsorption amount is associated every number of cycles of multiple times of the control sequences, as shown in FIGS. 6 and 7. Here, an example is adopted in which the target carbon dioxide adsorption amount is updated every 10 cycles. In the recovery amount change map data, the carbon dioxide recovery amount (carbon dioxide monitor value) detected through the sensor 15 is associated with the target carbon dioxide adsorption amount.

The initially calculated threshold value is an initial target carbon dioxide adsorption amount adopted from the first cycle to the 10th cycle. The updated threshold value is an updated target carbon dioxide adsorption amount. The updated threshold value is a target carbon dioxide adsorption amount assumed due to deterioration over time or the like of the electrochemical cell. Therefore, the updated threshold value is a value smaller than the initially calculated threshold value. In addition, the updated threshold value becomes a smaller value as the number of the cycles increases.

In addition, adsorption amount holding ranges are between the initially calculated threshold value and the updated threshold value and between the updated threshold value and the next updated threshold value. The adsorption amount holding range is a range where the current target carbon dioxide adsorption amount is held. On the other hand, a range out of the adsorption amount holding range is an adsorption amount update range. The adsorption amount update range is a range where the target carbon dioxide adsorption amount is updated from the current value.

In a step S300, it is determined whether the recovery amount is within the adsorption amount holding range. The controller 17 determines whether the carbon dioxide monitor value as the recovery amount is within the adsorption amount holding range. When the controller 17 determines that the carbon dioxide monitor value is within the adsorption amount holding range, the process proceeds to a step S310. When the controller 17 determines that the carbon dioxide monitor value is not within the adsorption amount holding range, the process proceeds to a step S320.

In the step S310, the target carbon dioxide adsorption amount is held. The controller 17 holds the current target carbon dioxide adsorption amount. In the case of the carbon dioxide monitor value indicated by dot hatching in FIG. 7, the controller 17 holds the current target carbon dioxide adsorption amount.

In the step S320, the target carbon dioxide adsorption amount is updated. The controller 17 updates the current target carbon dioxide adsorption amount to a new target carbon dioxide adsorption amount. In the case of the carbon dioxide monitor value indicated by diagonal hatching in FIG. 7, the controller 17 updates the target carbon dioxide adsorption amount.

In a step S330, a target carbon dioxide adsorption amount is set. The controller 17 sets the current target carbon dioxide adsorption amount or the updated target carbon dioxide adsorption amount as the target carbon dioxide adsorption amount when the adsorption mode execution time period is set. As described above, the controller 17 sets the target carbon dioxide adsorption amount from the carbon dioxide recovery amount.

As described above, the carbon dioxide recovery system 10 includes the controller 17 that detects, through the sensor 15, the recovery amount of the carbon dioxide recovered from the recovery device 12 to the $CO_2$ recovery tank 16. Then, the controller 17 acquires, as the target carbon dioxide adsorption amount, a correlation value correlated with the carbon dioxide recovery amount as a detection result through the sensor 15. Therefore, the carbon dioxide recovery system 10 can grasp the target carbon dioxide adsorption amount.

In addition, the controller 17 causes multiple times of the adsorption mode to be executed, and grasps the target carbon dioxide adsorption amount using the adsorption amount change map data created using the carbon dioxide recovery amounts detected through the sensor 15 in multiple times of the recovery mode executed corresponding to each adsorption mode. Then, the controller 17 applies the adsorption potential only during the adsorption mode execution time period obtained from the adsorption amount change map data. Therefore, the controller 17 can apply the adsorption potential only for a time period required to obtain the maximum adsorption amount. In other words, the controller 17 can suppress application of the adsorption potential for a time period longer than the time period required to obtain the maximum adsorption amount. Therefore, the controller 17 can appropriately control the application time period of the adsorption potential to obtain the maximum adsorption amount.

Since the controller 17 updates the adsorption amount change map data according to the carbon dioxide recovery amount detected through the sensor 15, it is possible to grasp the optimum target carbon dioxide adsorption amount and appropriately control the application time period of the adsorption potential even if the electrochemical cell deteriorates over time.

Although the preferred embodiments of the present disclosure have been described above, the present disclosure is not limited to the above embodiments at all, and various modifications can be made without departing from the gist of the present disclosure. For example, the configuration of the above embodiment may be modified as follows.
(First Modification)

The adsorption mode execution time period is not limited to that obtained from the adsorption amount change map data. The adsorption mode execution time period can also be obtained by calculating a predetermined relational expression. The controller 17 may obtain the adsorption mode execution time period by multiplying the carbon dioxide recovery amount [g] detected through the sensor 15 by a carbon dioxide adsorption coefficient [s/g].

The carbon dioxide adsorption coefficient is a coefficient indicated by a time period required for the carbon dioxide adsorbent to adsorb a predetermined amount of carbon dioxide. That is, the carbon dioxide adsorption coefficient is defined as a time period required to adsorb 1 [g] of carbon dioxide. The carbon dioxide adsorption coefficient [s/g] is adsorption time period [s]/carbon dioxide adsorption amount [g]. The first modification can achieve the same effects as those of the above embodiment.
(Second Modification)

Figure 11:
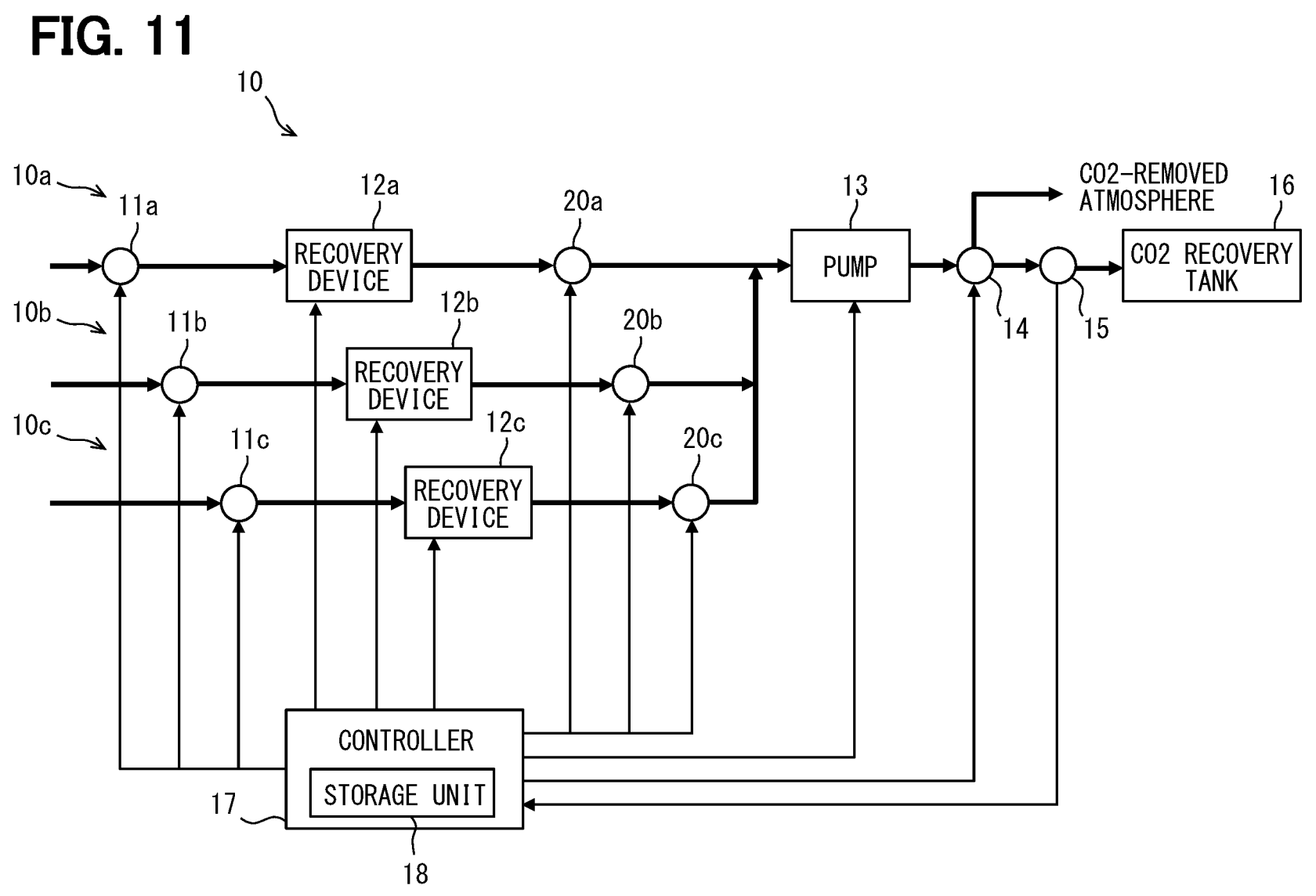

As shown in FIG. 11, the carbon dioxide recovery system 10 may include a plurality of recovery devices 12a to 12c, and the plurality of recovery devices 12a to 12c may be connected in parallel for the $CO_2$ recovery tank 16. That is, the carbon dioxide recovery system 10 may include a plurality of subsystems 10a to 10c. Each of the subsystems 10a to 10c includes one of the recovery devices 12a to 12c.

The subsystem 10a includes a channel open/close valve 11a and a switching valve 20a in addition to the recovery device 12a. The subsystem 10b includes a channel open/close valve 11b and a switching valve 20b in addition to the recovery device 12b. The subsystem 10c includes a channel open/close valve 11c and a switching valve 20c in addition to the recovery device 12c. Note that, here, an example including the three subsystems 10a to 10c is adopted as an example. However, the carbon dioxide recovery system 10 may include two subsystems or four or more subsystems.

The controller 17 can execute an individual mode (i.e. individual recovery mode) in which carbon dioxide is recovered individually from the electrochemical cell of each of the plurality of recovery devices 12a to 12c and execute a simultaneous mode (i.e. simultaneous recovery mode) in which carbon dioxide is recovered simultaneously from the respective electrochemical cells of at least two or more of the recovery devices.

Figure 12:
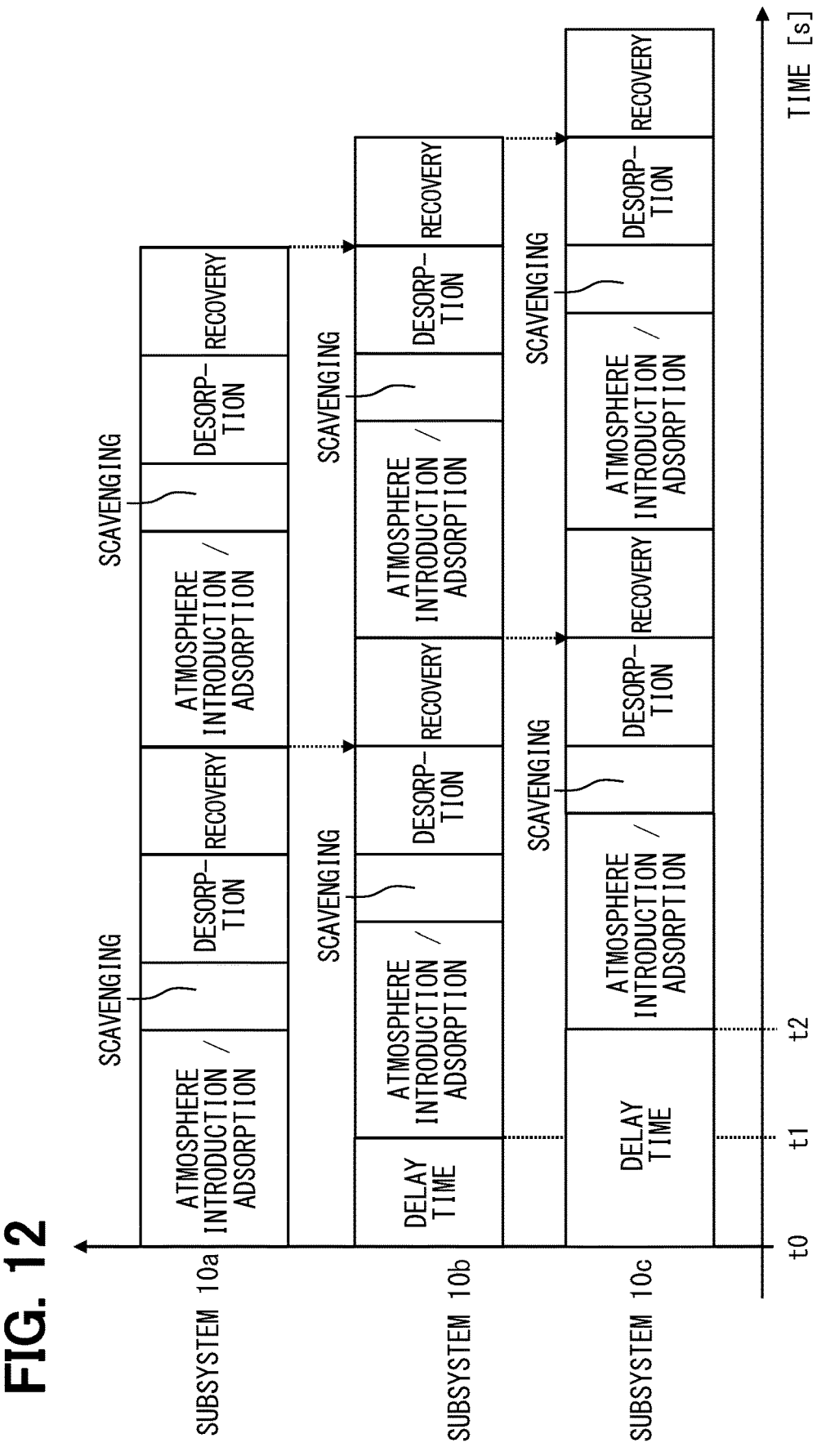
FIG. 12 is a time chart showing control sequences of the carbon dioxide recovery system according to the modification.

In the individual mode, the controller 17 causes a series of control sequences, including the adsorption mode and the recovery mode targeting each electrochemical cell of each of the recovery devices 12a to 12c, to be started at different times, as shown in FIG. 12. A timing t0 is defined, for example, as a start timing of the carbon dioxide recovery system 10. The controller 17 starts the control sequences in the subsystem 10a at the timing t0. The controller 17 starts the control sequences in the subsystem 10b at a timing t1 when a predetermined time period has elapsed from the timing t0. The controller 17 starts the control sequences in the subsystem 10c at a timing t2 when a predetermined time period has elapsed from the timing t1.

Therefore, in the individual mode, a delay time period occurs during which each of the subsystems 10a to 10c does not execute the control sequences. In the subsystem 10b, the period between the timing t0 and the timing t1 is the delay time period. In the subsystem 10c, the period between the timing t0 and the timing t2 is the delay time period. The delay time period corresponds to a period during which the control sequences are not executed. Therefore, the controller 17 causes, during the delay time period, the adsorption mode and the recovery mode for estimating the maximum adsorption amount to be executed. As a result, the carbon dioxide recovery system 10 can effectively utilize the delay time period. In the individual mode, each adsorption mode may be performed in the different subsystems 10a to 10c during the map creating process.

On the other hand, in the simultaneous mode, the controller 17 causes a series of the control sequences, including the adsorption mode and the recovery mode targeting each electrochemical cell of each of the recovery devices 12a to 12c, to be started at the same time. In the subsystems 10a to 10c, the control sequences are started simultaneously, for example, at the timing t0. Therefore, no delay time period occurs in the simultaneous mode.

In addition, the controller 17 may switch between the individual mode and the simultaneous mode according to a situation. The controller 17 switches the mode for the purpose of shortening the creation time period of the adsorption amount change map data, or the like.

Examples of the situation include: an initial operation of the carbon dioxide recovery system 10 (at the time of installation of equipment); a periodic state transition, from a dormant state to an operating state, of the carbon dioxide recovery system 10; periodic maintenance; return from a failure of the carbon dioxide recovery system 10; return from an external environmental abnormality of the carbon dioxide recovery system 10; and the like. Furthermore, in the periodic maintenance, the following situations are considered in which: no electrochemical cell is replaced; some electrochemical cells are replaced; and all electrochemical cells are replaced. The external environmental abnormality is a power failure or the like.

The controller 17 executes the individual mode at the time of the installation of equipment and at the time of the return from a failure, and executes the simultaneous mode at the time of the state transition from a dormant state to an operating state and at the time of the return from the external environmental abnormality. In addition, the controller 17 executes the simultaneous mode when no electrochemical cell is replaced and when some electrochemical cells are replaced, and executes the individual mode when all electrochemical cells are replaced.

Furthermore, in the individual mode, the controller 17 may use common adsorption amount change map data for the subsystems 10a to 10c. On the other hand, in the simultaneous mode, the controller 17 may use individual adsorption amount change map data for each of the subsystems 10a to 10c.

The carbon dioxide recovery system 10 may be configured to be able to execute only one of the individual mode and the simultaneous mode.

Although the present disclosure has been described in accordance with the embodiments, it is understood that the present disclosure is not limited to the embodiments and structures. The present disclosure also includes various modifications and variations within the scope of equivalents. In addition, although various combinations and modes are shown in the present disclosure, other combinations and modes including only one element, more elements, or less elements are also included in the scope and idea of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A carbon dioxide recovery system that recovers carbon dioxide from a mixed gas containing carbon dioxide by an electrochemical reaction, the system comprising:
   a carbon dioxide recovery tank configured to store recovered carbon dioxide;
   a recovery device including a housing into which the mixed gas is supplied, and an electrochemical cell housed in the housing, the electrochemical cell including a working electrode having an adsorbent capable of adsorbing carbon dioxide, and a counter electrode paired with the working electrode;
   a sensor configured to detect a recovery amount that is an amount of carbon dioxide recovered in the recovery device and sent to the carbon dioxide recovery tank; and
   a controller configured to execute an adsorption mode in which carbon dioxide is adsorbed and a recovery mode in which carbon dioxide is recovered, wherein
   the controller is configured to:
      apply a first potential between the working electrode and the counter electrode only for an adsorption time period in the adsorption mode such that the adsorbent adsorbs carbon dioxide, the adsorption time period corresponding to a target adsorption amount that is an amount of carbon dioxide that can be adsorbed by the adsorbent, and
      apply a second potential between the working electrode and the counter electrode only for a recovery time period in the recovery mode such that the carbon dioxide adsorbed by the adsorbent is desorbed, and
   the controller is configured to:
      acquire and update the target adsorption amount as a correlation value correlated with the recovery amount that is a detection result of the sensor; and
      apply the first potential only for the adsorption time period corresponding to the updated target adsorption amount.

2. The carbon dioxide recovery system according to claim 1, further comprising a storage unit that stores adsorption-amount change data indicating association between the target adsorption amount and the adsorption time period, and recovery-amount change data indicating association between a change in the recovery amount and the target adsorption amount, wherein
   the controller is configured to
      acquire the target adsorption amount from the recovery-amount change data as the correlation value associated with the recovery amount that is the detection result, and
      acquire the adsorption time period from the adsorption-amount change data based on the acquired target adsorption amount.

3. The carbon dioxide recovery system according to claim 2, wherein
   the adsorption mode is one of adsorption modes executed by the controller at different times,
   the recovery mode is one of recovery modes executed by the controller and corresponding, respectively, to the adsorption modes, and
   the controller is configured to
      acquire detection results in the recovery modes, and
      create the adsorption-amount change data based on the detection results by estimating a maximum adsorption amount of the electrochemical cell as the target adsorption amount and estimating the adsorption time period corresponding to the maximum adsorption amount.

4. The carbon dioxide recovery system according to claim 1, wherein
   the recovery device is one of recovery devices,
   the recovery devices are connected in parallel to the carbon dioxide recovery tank, and
   the controller is configured to execute an individual mode in which carbon dioxide is recovered individually in each of the recovery devices, and a simultaneous mode in which carbon dioxide is recovered simultaneously in at least two or more of the recovery devices.

5. The carbon dioxide recovery system according to claim 3, wherein the recovery device is one of recovery devices, the recovery devices are connected in parallel to the carbon dioxide recovery tank, and the controller is configured to execute an individual mode in which carbon dioxide is recovered individually in each of the recovery devices by starting a control sequence individually in each of the recovery devices at different times, the control sequence including execution of the adsorption mode and execution of the recovery mode, and execute the adsorption modes and the recovery modes for estimating the maximum adsorption amount in a period during which the control sequence is not executed.

6. The carbon dioxide recovery system according to claim 1, wherein the controller is configured to acquire the adsorption time period by multiplying the recovery amount as the detection result by a coefficient that is a time period required for the adsorbent to adsorb a predetermined amount of carbon dioxide.

7. The carbon dioxide recovery system according to claim 1, wherein the controller is configured to execute a scavenging mode in which a residual mixed gas in the housing is released to an outside of the housing in a state where the first potential is applied after execution of the adsorption mode and before execution of the recovery mode.

8. A carbon dioxide recovery system that recovers carbon dioxide from a mixed gas containing carbon dioxide by an electrochemical reaction, the system comprising:

a carbon dioxide recovery tank configured to store recovered carbon dioxide;

a recovery device including a housing into which the mixed gas is supplied, and an electrochemical cell housed in the housing, the electrochemical cell including a working electrode having an adsorbent capable of adsorbing carbon dioxide, and a counter electrode paired with the working electrode;

a sensor configured to detect a recovery amount that is an amount of carbon dioxide recovered in the recovery device and sent to the carbon dioxide recovery tank;

a storage unit that stores adsorption-amount change data indicating association between a target adsorption amount and an adsorption time period, and recovery-amount change data indicating association between a change in the recovery amount and the target adsorption amount, the target adsorption amount being an amount of carbon dioxide that can be adsorbed by the adsorbent; and a controller configured to execute an adsorption mode in which carbon dioxide is adsorbed and a recovery mode in which carbon dioxide is recovered, wherein the controller is configured to:

apply a first potential between the working electrode and the counter electrode only for an adsorption time period in the adsorption mode such that the adsorbent adsorbs carbon dioxide, the adsorption time period corresponding to a target adsorption amount that is an amount of carbon dioxide that can be adsorbed by the adsorbent, and apply a second potential between the working electrode and the counter electrode only for a recovery time period in the recovery mode such that the carbon dioxide adsorbed by the adsorbent is desorbed, and the controller is configured to acquire the target adsorption amount from the recovery-amount change data as a correlation value correlated with the recovery amount that is a detection result of the sensor, and acquire the adsorption time period from the adsorption-amount change data based on the acquired target adsorption amount.

9. The carbon dioxide recovery system according to claim 8, wherein the adsorption mode is one of adsorption modes executed by the controller at different times, the recovery mode is one of recovery modes executed by the controller and corresponding, respectively, to the adsorption modes, and the controller is configured to acquire detection results in the recovery modes, and create the adsorption-amount change data based on the detection results by estimating a maximum adsorption amount of the electrochemical cell as the target adsorption amount and estimating the adsorption time period corresponding to the maximum adsorption amount.

10. The carbon dioxide recovery system according to claim 8, wherein the recovery device is one of recovery devices, the recovery devices are connected in parallel to the carbon dioxide recovery tank, and the controller is configured to execute an individual mode in which carbon dioxide is recovered individually in each of the recovery devices, and a simultaneous mode in which carbon dioxide is recovered simultaneously in at least two or more of the recovery devices.

11. The carbon dioxide recovery system according to claim 9, wherein the recovery device is one of recovery devices, the recovery devices are connected in parallel to the carbon dioxide recovery tank, and the controller is configured to execute an individual mode in which carbon dioxide is recovered individually in each of the recovery devices by starting a control sequence individually in each of the recovery devices at different times, the control sequence including execution of the adsorption mode and execution of the recovery mode, and execute the adsorption modes and the recovery modes for estimating the maximum adsorption amount in a period during which the control sequence is not executed.

12. The carbon dioxide recovery system according to claim 8, wherein the controller is configured to acquire the adsorption time period by multiplying the recovery amount as the detection result by a coefficient that is a time period required for the adsorbent to adsorb a predetermined amount of carbon dioxide.

13. The carbon dioxide recovery system according to claim 8, wherein the controller is configured to execute a scavenging mode in which a residual mixed gas in the housing is released to an outside of the housing in a state where the first potential is applied after execution of the adsorption mode and before execution of the recovery mode.

* * * * *